Oct. 20, 1953

H. C. SAVINO 2,656,528

SYSTEM FOR INDICATING TIME-SPACE LAG AND LEAD

Filed May 21, 1948

INVENTOR.
HENRY C. SAVINO
BY
ATTORNEYS

Oct. 20, 1953    H. C. SAVINO    2,656,528
SYSTEM FOR INDICATING TIME-SPACE LAG AND LEAD
Filed May 21, 1948    5 Sheets-Sheet 2

INVENTOR.
HENRY C. SAVINO
BY
ATTORNEYS

Oct. 20, 1953 H. C. SAVINO 2,656,528
SYSTEM FOR INDICATING TIME-SPACE LAG AND LEAD
Filed May 21, 1948 5 Sheets-Sheet 3

INVENTOR.
HENRY C. SAVINO
BY
ATTORNEYS

Oct. 20, 1953   H. C. SAVINO   2,656,528
SYSTEM FOR INDICATING TIME-SPACE LAG AND LEAD
Filed May 21, 1948   5 Sheets-Sheet 4

INVENTOR.
HENRY C. SAVINO
BY
ATTORNEYS

Patented Oct. 20, 1953

2,656,528

UNITED STATES PATENT OFFICE 2,656,528

SYSTEM FOR INDICATING TIME-SPACE
LAG AND LEAD

Henry C. Savino, Jersey City, N. J.

Application May 21, 1948, Serial No. 28,374

13 Claims. (Cl. 340—268)

This invention relates to indicating systems, and refers more particularly to systems capable of indicating time-space lag or lead for use on trains, airplanes, buses or any other conveyance.

An object of the present invention is the provision of a system which will effectively and directly indicate in hours, minutes and/or seconds the extent of the deviation of the movements of a vehicle from its pre-determined schedule.

Another object of the present invention is the provision of an electrical indicating system which is suitable not only in conjunction with trains, airplanes and other vehicles travelling large distances, but also in cases where the distances travelled are comparatively small or for industrial processes wherein time-space indicating means are desirable.

A further object is the provision of an indicating system which contains an indicator capable of demonstrating directly the number of hours, minutes, etc. constituting the deviation of a vehicle from its pre-determined schedule.

Yet another object is the construction of an indicating system provided with a graph for continuously recording the deviations of a vehicle from a pre-set schedule.

Yet another object of the present invention is the provision of an indicating system which provides for the scheduled stops of a vehicle and the time for each stop made by a vehicle while following a pre-determined schedule and route.

Yet another object is the provision of a time-space indicating system, the indications of which are transmitted to various localities for the purpose of observation.

A further object is the provision of an indicating system which is so constructed that time-space lag or lead may be conveniently observed at various remote points.

Another object is the provision of an indicating system having suitable means for interpreting indications received at remote points so as to enable an observer located at a remote point to ascertain directly in hours and minutes the time of arrival of a moving vehicle.

A still further object of the present invention is the provision of an indicating system capable of being reset by the use of push buttons.

A still further object is the provision of an indicating system which is provided with means for automatic resetting.

A further object is the provision of means for sending indications by wireless to a distant station or to a dispatch office, designating the position of the vehicle as it travels along a fixed route.

Another object is the provision of a position indicator located at a remote station or dispatch office, and adapted to receive indications automatically as they are being transmitted by a vehicle moving along a fixed route.

Yet another object is the provision of apparatus which sends out position indications and which cooperates with a clutch mechanism adapted to reset the apparatus at the end of each trip.

A still further object is the provision of a system having illuminated pointers movable along a graduated scale of the indicator and capable of indicating the position or direction of travel of a vehicle along a fixed route.

The foregoing, and other objects of the present invention, may be realized through the provision of an indicating system provided with an indicator precisely calibrated in hours and minutes and operated to opposed electrical impulses, one of which corresponds to the actual movements of a body, while another shows a theoretical pre-determined schedule.

Suitable means are provided to indicate visually whether the movable body is ahead of or behind schedule, or on time. The indicating device provides for the scheduled stops of the vehicle through the use of a movable tape capable of providing and interrupting electrical connections.

This instrument is further provided with resetting means capable of operating by means of push buttons, as well as automatically, for the purpose of adjusting the various elements of the system to the beginning of either the forward or return runs.

Furthermore, means are provided for operating indicators at remote points so as to show the locations of a remote vehicle.

According to a preferred embodiment of the inventive idea the indicator showing the time-space lag or lead is inserted in a system wherein a clock-actuated device is balanced by a distance-actuated device when the vehicle is on schedule, the clock-actuated device being operated in accordance with a pre-set schedule. When the vehicle is not on schedule the balance is disturbed and the indicator will show directly in hours and minutes and seconds, if necessary, the extent of deviation of the movements of the vehicle from a pre-determined schedule.

The invention will appear more clearly in the following detailed description, when taken in connection with accompanying drawings, showing, by way of example, preferred embodiments of the inventive idea.

In the drawings:

Figure 14 is a diagram showing apparatus located at a remote point for receiving the indications sent by the transmitting equipment shown in Figure 13.

Figure 15 is a diagram illustrating an indicator utilizing indications received from a distant vehicle which show directly the hour and minute of arrival of that vehicle at a station or the like.

Figure 16 illustrates diagrammatically the gear device used for operating the hour and minute hands of the indicator shown in Figure 15.

Figure 17 is a section along the line 17—17 of Figure 16.

Figures 1, 2, 3, 4, 5, 6, 7:
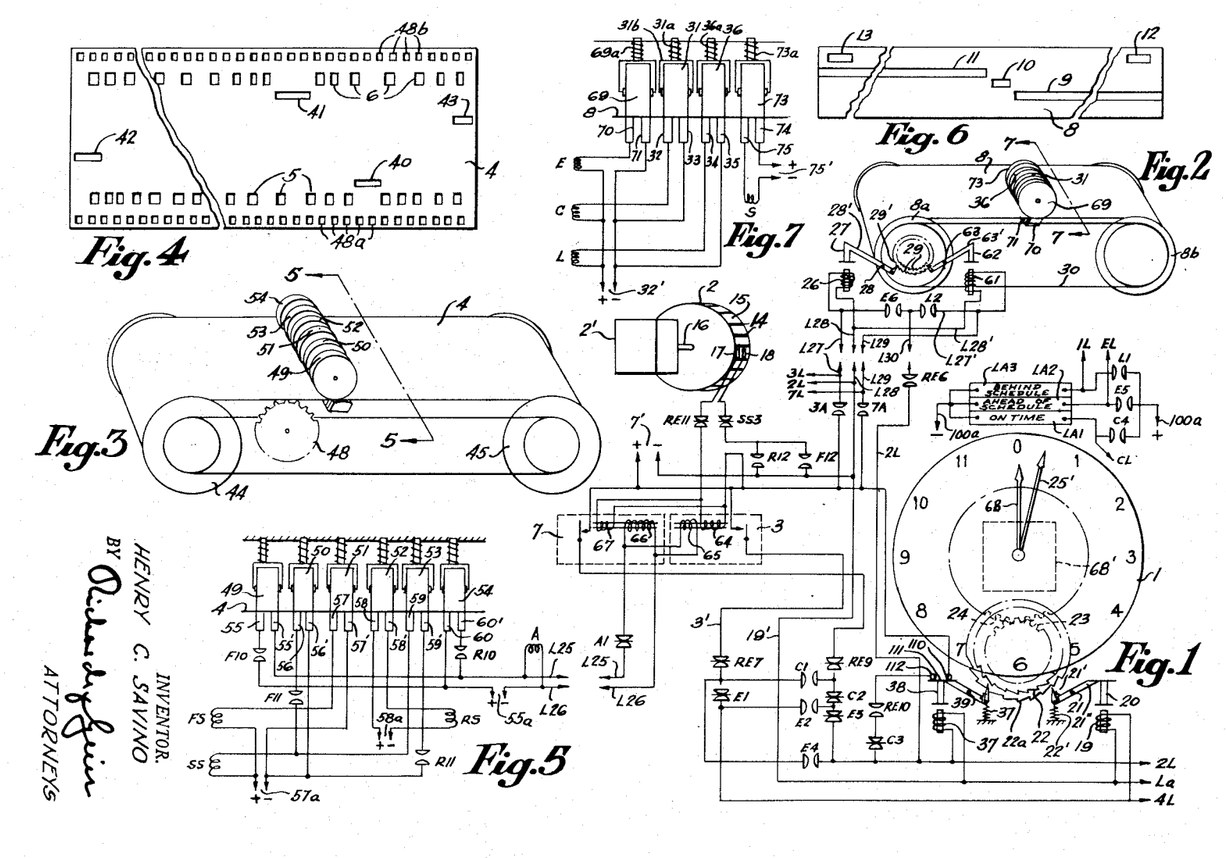
Figure 1 is a diagram showing the mechanical and electrical connections of the indicator.
Figure 2 is a perspective view illustrating the tape which indicates whether a vehicle is behind or ahead of schedule.
Figure 3 is a perspective view showing the distance-actuated tape.
Figure 4 is a top view of the tape shown in Figure 3.
Figure 5 is a diagram illustrating the electrical connections of the parts shown in Figure 3.
Figure 6 is a top view of the tape shown in Figure 2.
Figure 7 illustrates the electrical connections of the parts shown in Figure 2.

The time-space lag or lead indicating system, shown in Figures 1 to 17, includes an indicator 1, shown in Figure 1, and comprising a disk provided with a scale similar to that of a clock or watch. An hour hand 68 and a minute hand 25 are movable over the disk 1, and are used to indicate in hours or minutes the extent of time by which a vehicle is behind or ahead of schedule. The hands 68 and 25 are interconnected by the usual clock-work mechanism 68', which is illustrated diagrammatically in Figure 1.

The indicator 1 is actuated when impulses received from a disk 2 and a tape 4 are out of balance. It is apparent that when the impulses balance one another the two hands 68 and 25 of the indicator 1 will point to zero.

The disk 2 is actuated by a clock mechanism indicated diagrammatically by 2' which is connected to a shaft 16.

The shaft 16 is similarly connected with a disk 2. The periphery 15 of the disk 2 carries conducting elements 14. The conducting elements 14 are separated from one another so that the speed of movement of these elements, which depends upon the speed of rotation of the shaft 16, will be proportionate to a pre-determined time-space schedule.

The conductive elements are moved so that they will be brought in engagement with brushes 17 and 18.

By way of example, let us assume that the rate of movement of the disk 2 is such that conductive elements 14 will engage brushes 17 and 18 once per minute.

Brush 17 is connected with contacts RE11, which are connected to the relay 3.

Brush 18 is connected with contacts SS3, which are connected with contacts R12 and F12. The contacts R12 and F12 are connected in parallel to each other, and are also connected to a terminal of the source of energy 7'. The minute hand 25 of the indicator 1 is connected through the clockwork mechanism 68' with the toothed wheel 24, so that the rotation of the toothed wheel 24 will move the minute hand 25, or the hour hand 68, or both, over the face of the indicator 1.

The gear 24 meshes with a pinion 23, which is connected with two gear wheels 22 and 22a, and the gear wheel 22a cooperates with a pawl 21' carried upon one end of a lever 21''; while gear 22 cooperates with stepper arm 38.

The lever 21'' is pivoted at 21 intermediate its ends. The pawl 21' is held in a retracted position in reference to the gear wheel 22a by means of a spring 22'.

The arm 21'' is pivotally connected with an arm 20, which is movable by means of a solenoid 19.

The arrangement is such that when the solenoid 19 is energized the pawl 21' will engage the gear 22a, and will turn it counter-clockwise, thereby causing a clockwise rotation of the gear 24 and the hands connected therewith.

The relay 3 is connected with the solenoid 19 by the conduit 3' which includes the contacts Re7 and E1.

The solenoid 19 is connected with the source 7' by the conduit 19'.

Figure 2 shows a tape 8 which extends over reels 8a and 8b. The reel 8a is used to move the tape 8. For that purpose the reel 8a is connected with gears 29 and 29'. The gear 29 meshes with one end of the arm 63', while the gear 29' meshes with an end of an arm 28'. The arm 28' is pivoted intermediate its ends at 28.

Another end of the arm 28' is pivotally connected with an arm 27, which is operated by a solenoid 26. The solenoid 26 is connected by conduits L27 and L28 with the source 7'. The conduit L27 includes contacts 3A. It is thus apparent that the closing of the contacts 3A will establish electrical connection between the source 7' and the solenoid 26 when the relay 3 is actuated and closes its contact 3A.

It is further apparent that when the solenoid 26 is energized it will swing the arm 28' and thereby turn the sprocket 29' and move the tape 8.

A belt 30 extends between the rollers 8a and 8b, thereby assuring the movement of the tape 8 when the sprockets 29 or 29' are actuated.

The solenoid 61 is connected by a wire L27' with the line L27. The line L27' includes the contacts E6 and L2. L28' connects the solenoid 61 with the line L28. Line L30 connects the line L27' with the line 2L leading to the solenoid 37. The line L2 includes the contacts RE6.

The indicator shown in Figure 1 also includes signals indicating whether a vehicle is on time, ahead of schedule or behind schedule. Transparent plates provided with this insignia are illuminated by lamps LA1, LA2 and LA3, which are all connected at one end to the negative terminal of a source 100a.

The lamps LA1, indicating that the vehicle is on time, are connected to the positive terminal of the source 100a by a line CL containing contacts C4. The lamp LA2 is connected with a positive terminal 100a by a line EL contining contacts E5. This lamp indicates that the vehicle is ahead of schedule. The lamp LA3, which indicates that the vehicle is behind schedule, is connected with a terminal 100a by a line IL containing contacts L1.

As shown in Figure 6, the tape 8 contains a central perforation 10 and perforations 9 and 11, located on opposite sides of the perforation 10. Perforations 12 and 13 are situated at opposite ends of the tape 8.

In the central position of the tape 8 the perforation 10 is situated below the brushes 32 and 33 shown in Figure 7. These brushes are connected to a relay C and to a source of electrical energy 32'. A conducting wheel 31 is located above the tape 8 and is placed in engagement with the brushes 32 and 33 through the perforation 10 by means of a spring 31a which presses downwardly on the bearing 31b carrying the axle of the wheel 31. Thus, the spring 31a maintains the wheel 31 in contact with the brushes 32 and 33 whenever the perforation 10 is located in its central position.

A conducting wheel 36 is located above the perforation 11 of the tape 8, and is pressed by a spring 36a against brushes 34 and 35, which are connected to a relay L and the electrical energy source 32'. A third conducting wheel 69 is located over the perforation 9 of the tape 8, and may be brought into contact with brushes 70 and 71 which are connected to a relay E and the electrical source 32'. The wheel 69 is pressed downwardly by a spring 69a.

A wheel 73 may be located above the perforation 12, or the perforation 13, and is pressed downwardly in a similar manner by a spring 73a. The conducting wheel 73 may be engaged by brushes 74 and 75, which are connected to a relay S and to a source 75', which may be the same as the source 32'.

The distance-actuated tape 4, and the means for operating the tape, are shown in Figures 3, 4, 5 and 10.

As shown in Figure 4 the tape 4 includes perforations 5 and 6, which are used to transmit signals to the indicator 1, said signals being opposed to those transmitted by the strips 14 and the disk 2.

Perforations 5 represent the scheduled unit distance to be covered by a vehicle per unit time in the forward direction. Perforations 6 represent the scheduled unit distance to be covered per unit time during the return trip.

Let it be assumed, by way of example, that the indicator 1 should show the deviations of a vehicle from its predetermined schedule in hours and minutes. The clock-actuated disk 2 will be then so connected to the clock 2' and the number of contacts 14 upon the disk will be such that the brushes 17 and 18 will come in contact with the conducting elements 14 once every minute and, therefore, the indicator 1 will receive impulses every minute from the disk 2. Therefore, perforations 5 and 6 must be placed upon the tape 4 also so as to transmit impulses every minute to the indicator 1.

Let it be further assumed, by way of example, that the tape 4 is wound upon the reel 44 and the reel 45 by the sprocket 48 at the rate of one inch per mile travelled by the vehicle. Should the predetermined schedule of the vehicle proscribe that the vehicle must travel ten miles in ten minutes, then one perforation must be provided per inch of tape along ten inches of tape so as to counterbalance the ten pulsations of the disk 2.

Should a timetable require that the vehicle cover the next five miles in ten minutes, it will be necessary to provide ten perforations upon the next five inches of tape since the tape moves at the rate of one inch per mile travelled by the vehicle. Thus, there will be one perforation for each minute of the ten minutes allowed to cover the five miles. Since five inches of tape must be perforated ten times, there will be one perforation every one-half inch of tape. It is apparent that the velocity is used to determine the location of the perforations 5 and 6 which depend upon the unit distance to be covered in unit time.

Perforations 40 upon the tape 4 represent scheduled stops during the forward run of a vehicle, while perforations 41 represent stops during the return trip. The length of the perforations 40 and 41, in the direction of the tape, corresponds to the duration of the stops. Thus, if the duration of a stop is five minutes, a perforation 40 may be made five inches long, or it may be made ten inches long if the duration of the stop is ten minutes.

A perforation 42 is provided at one end of the tape 4 and is used to stop the reel at the end of the forward trip of the vehicle. A perforation 43 is situated at the other end of the tape 4, and is used to stop the reel at the end of the return trip.

As shown in Figures 3 and 5, conductive wheels 49 to 54, inclusive, are located directly above the tape 4, and in contact therewith. Brushes 55 and 55' are located directly below the tape 4, and so that they may contact the wheel 49 through one of the perforations 5. Lines L25 and L26 of the brushes 55 and 55' include the winding 66 of the relay 7, contacts F10 and A1 and a source 55a of electrical energy. A relay A is connected in parallel to the brushes 55 and 55'.

Brushes 56 and 56' are located below the wheel 50, and are short-circuited by that wheel when a perforation 40 moves between the wheel 50 and the brushes 56 and 56'. The brushes 56 and 56' are connected to the circuit of a relay SS, and also to contacts F11.

Brushes 57 and 57' are adapted to be short-circuited by the wheel 51 through the perforation 42. The brushes 57 and 57' are connected to a relay FS and to a source 57a of electrical energy.

Brushes 68 and 58' are adapted to contact the conducting wheel 52 through the perforation 43 and are connected to a relay RS and to a source 58a.

Brushes 59 and 59' are adapted to be contacted by the wheel 53 through one of the perforations 41 and are connected to a relay SS. The circuit of the brushes 59 and 59' includes the source 57a and the contacts R11. It will be noted that the brushes 56 and 56' are connected to the same relay as brushes 59 and 59'.

Finally the brushes 60 and 60' are adapted to be contacted by the wheel 54 through one of the perforations 6. The brushes 60 and 60' are connected to the lines L25 and L26 of the brushes 55 and 55'. Contacts R10 are connected to the brush 60'.

Relay 3, shown in Figure 1, includes a main coil 64 and an auxiliary coil 65. The main coil 64 is connected to the brushes 17 and 18 by a circuit which includes the contacts RE11, SS3, R12 and F12.

The actuated elements of the relay 3 are connected to the line 4L, to the solenoids 37 and 19 of the indicator 1, and to the solenoid 26 operating the tape 8.

The relay 7 includes a main coil 66 and an auxiliary coil 67. The main coil 66 is connected to the lines L25 and L26.

The auxiliary coil 65 of the relay 3 has a number of ampere turns sufficient to neutralize the coil 64, and to prevent the relay 3 from picking up although the coil 65 is not strong enough to operate the relay 3 when it is energized by itself. The auxiliary coil 67 of the relay 7 neutralizes the main coil 66 in a similar manner. The arrangement is such that when the coils 66 and 64 are energized simultaneously the two relays 3 and 7 will fail to pick up since they neutralize each other by energizing the neutralizing coils 65 and 67.

The tape 4 is actuated by sprocket wheels 48 engaging sprocket tracks 48a and 48b provided upon the tape 4.

Figures 8, 9, 10, 11A:
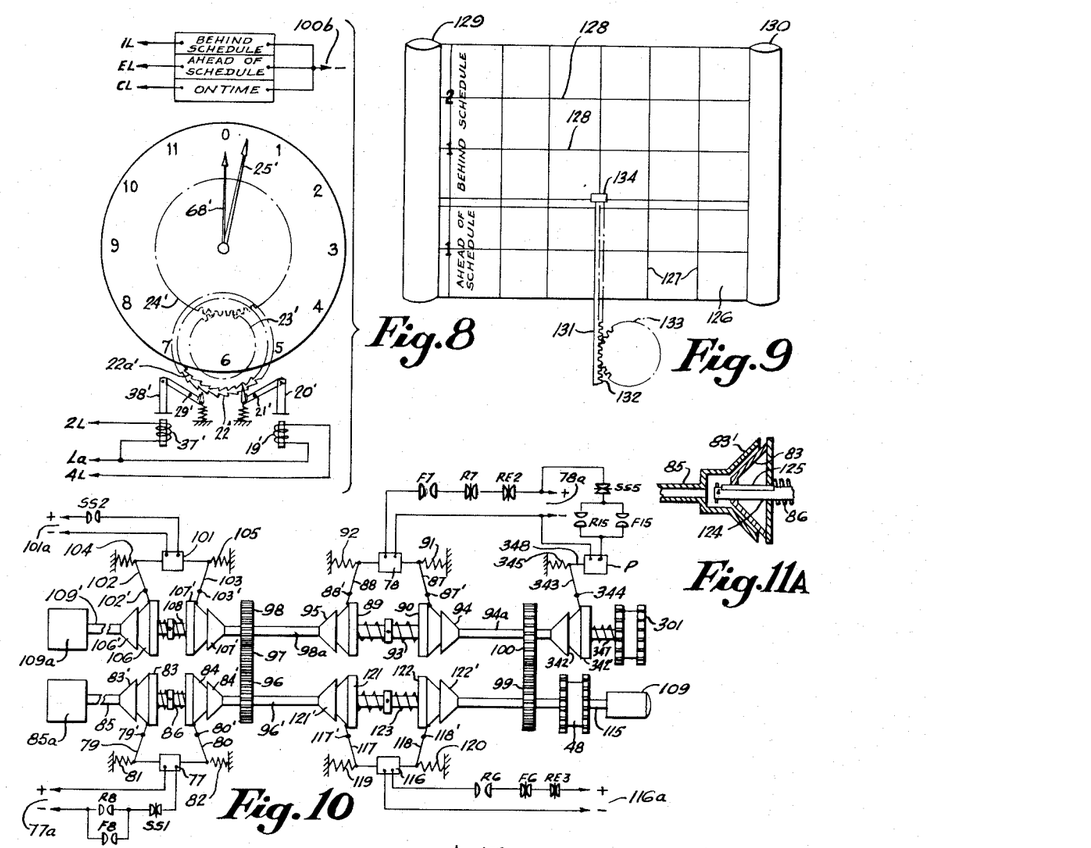
Figure 8 illustrates an indicator similar to the one shown in Figure 1.
Figure 9 illustrates a device for making, graphically, a permanent record of the deviations of a vehicle from a pre-determined schedule.
Figure 10 is a diagram illustrating the clutch arrangement used for driving the distance tape shown in Figure 3.
Figure 11A is a partial sectional view of one of the clutch mechanisms shown in Figure 10.

The mechanism for actuating the sprocket wheel 48 is shown in Figure 10 of the drawings.

The sprocket wheel 48 is mounted upon a shaft 115 which is connected with a motor 109 and carries a gear wheel 99 as well as a clutch 122'.

A distance-actuated device 85a of any suitable construction known in the art is firmly connected with a shaft 85, in turn connected with a coupling 83'. The coupling or clutch 83' may be engaged by the clutch 83 which is engaged by a spring 86. A clutch 84 is also engaged by the spring 86 and is adapted to engage a clutch 84' which is carried upon a shaft 96'.

The clutch plates 83 and 83' are shown in cross-section in Figure 11A. The plate 83 is movable axially over the shaft 124 and is keyed upon shaft 124 by a pin 125. It is apparent that when the clutch plates 83' and 83 are placed against each other by the spring 86 a permanent connection is established between shaft 85 and shaft 124.

The shaft 96' carries a gear wheel 96 and a clutch 121'. The clutch 121' cooperates with a clutch 121 engaged by a spring 123. The spring 123 also presses a clutch 122 against a clutch 122'. The clutches 83 and 83', 84 and 84' are operated by a solenoid 77. The solenoid 77 operates arms 79 and 80 which swing about their pivot points 79' and 80' respectively. A spring 81 engages the arm 79 while a spring 82 engages the arm 80. The springs 81 and 82 maintain the clutch plates 83 and 84 in the position shown in the drawing, namely, away from the clutch plates 83' and 84', thereby compressing the spring 86.

When the solenoid 77 is energized it pulls the arms 79 and 80 away from the clutch plates 83 and 84 so that the spring 86 can expand and press the clutch plate 83 against the clutch plate 83'. At the same time the clutch plate 84 is pressed by the spring 86 against the clutch plate 84'. Then, a connection is established between the distance-actuated device 85a and the shaft 96' through the clutches 83, 83', 84 and 84'.

A similar construction is used to connect the shaft 96' with the shaft 115. This connection includes clutches 121 and 121', 122 and 122', which are actuated by solenoid 116. A spring 123 tends to establish a connection between the clutch plates 121 and 121', and also between the clutch plates 122 and 122'. When the solenoid 116 is de-energized the clutch plates 121 and 122 are kept out of engagement with the clutch plates 121' and 122', respectively, by the arms 117 and 118 which pivot about the pivot points 117' and 118' respectively, and are engaged by the springs 119 and 120 respectively.

The solenoid 77 is supplied with electric current from a source 77a and is connected to contacts R8 and SS1. Contacts F8 are connected in parallel with the contacts R8.

The solenoid 116 is supplied with electric current from a source 116a and is connected to contacts R6, F6 and RE3.

The gear 96 meshes with the pinion 97 which meshes with a gear 98 keyed upon a shaft 98a. The shaft 98a is firmly connected with clutch plates 107' and 95.

A shaft 109' is connected with a clock mechanism 109a and may be connected with the shaft 98a by means of clutches 106, 106', 107 and 107'. This construction is similar to the previously described clutch constructions. A spring 108 tends to press clutch plates 106 and 107 against the clutch plates 106' and 107', respectively. The clutch plates 106 and 107 are maintained at a distance from the clutch plates 106' and 107' by the arms 102 and 103 which swing about pivot points 102' and 103', and are engaged by springs 104 and 105. The arms 102 and 103 may be actuated by a solenoid 101, which is connected with a source 101a and contacts SS2.

The shaft 98a may be connected with a shaft 94a through a clutch which includes clutch plates 95, 89, 90 and 94. A spring 93 tends to press the clutch plate 89 against the clutch plate 95 and also tends to press the clutch plate 90 against the clutch plate 94. A solenoid 78 maintains these clutch plates out of engagement by means of arms 87 and 88 which swing about the pivot points 87' and 88' and are engaged by springs 91 and 92, respectively.

A gear 100 is mounted upon the shaft 94a and meshes with the gear 99.

A clutch, consisting of clutch plates 342 and 342', is used to establish a connection between a sprocket wheel 301 and a shaft 94a. A spring 341 tends to press the clutch plate 342' against the clutch plate 342. The clutch plate 342' is maintained at a distance from the clutch plate 342 by an arm 343 which swings about the pivot 344, and which is engaged by a spring 345. The arm 343 is pivotally connected with a rod 348, which may be energized by the solenoid P. The solenoid P is connected with a solenoid 78, and with a source 78a. The circuit of the solenoids 78 and P include contacts F7, R7, RE2, SS5, F15 and R15.

Figure 9 shows a graph which may be produced by the use of a pinion 133. The pinion 133 is suitably attached to the stepper 29 shown in Figure 2, which is used to actuate the tape 8. The pinion 133 engages the teeth 132 of the rack 131. A graph paper 126 is provided with distance lines 127 and time lines 128, the lines 128 being marked in hours and minutes, and is wound on reels 129 and 130. The reels 129 and 130 are actuated by any suitable distance-actuated mechanism, which is not shown in the drawings. The rack 131 carries a pen or pencil 134 which is used to inscribe a line upon the graph paper 126.

As the graph paper 126 is moved by the distance-actuated mechanism any deviation of the movements of the vehicle from its pre-set schedule will be recorded by the stylus 134 through the pinion 133 and the rack 131 at the same time as it is indicated upon the indicator 1. Thus, the graph serves as a permanent record of any deviations of the vehicle from its predetermined schedule.

*Operation during forward movement*

The drawings show all the circuits in their de-energized positions. The forward operation of the apparatus is started by a user who presses the button 76 of the relay F, shown in Figure 11. Then, the relay F is energized through a circuit which includes the terminals 76a and the contacts R2, C5 and FS2. As soon as the relay F is energized it will close its contacts F1, F2, F4, F5, F7, F8, F10, F11, F12 and F13, while the contacts F3 and F6 will be open. The opening of the contacts F3, shown in Figure 11, will prevent the relay R from picking up as long as the relay F is energized.

Figure 11:
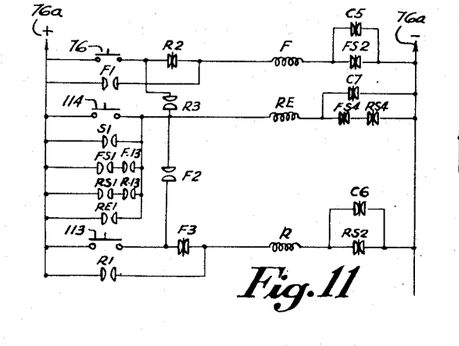
Figure 11 is a diagram showing the electrical circuit of the system used for starting, reversing and resetting operations.

The closing of the contacts F1 will establish a holding circuit to the relay F for purposes to be described in conjunction with the resetting operation hereinafter referred to in detail.

Relay F7, shown in Figure 10, will establish a connection between the solenoid 78 and the source 78a, so that the solenoid 78 will be energized and will release the arms 87 and 88.

At the same time the contacts F8 will be closed, thereby connecting the source 77a to the solenoid 77. The solenoid 77 will release the arms 79 and 80 so that the distance actuated mechanism 85a will be connected to the shaft 96' through the clutches 83', 83, 84 and 84'.

As soon as the solenoid 78 is energized the clutch plates 95 and 89, as well as the clutch plates 90 and 94, will be brought into engagement. Then the sprocket wheel 48 which drives the distance-actuated tape 4 will be driven by the distance-actuated mechanism 85a by means of the gear wheels 96, 97, 98, 100 and 99.

As shown in Figure 1, the indicator 1 is actuated in one direction by the tape 4 and its perforations 5 (during the forward movement), as well as the associated relay 7, while the indicator 1 is actuated in the opposite direction by the pulsations from the clock-driven disk 2, and its associated relay 3.

It is apparent that the tape 8 and its perforations 9 to 13 act in conjunction with the relays E, C, L and S to demonstrate whether the indicator 1 shows that the vehicle is behind or ahead of schedule.

During the rotation of the disk 2 the brushes 16 and 17 are contacted by the conducting elements 14 and then close the circuit to the relay 3. As soon as the relay 3 is energized it closes the circuit to the stepper switch coil or solenoid 19, which thus becomes energized. The energization of the coil 19 causes the arm 20 to move downward and to swing the arm 21" about the pivot point 21, thus causing the end 21' of the arm to engage the gear wheel 22a and to move it counter-clockwise. The gear 23, which is connected to the gear 22, will also move counter-clockwise and will move clockwise the gear 24 and the minute hand 25, which is connected therewith by the mechanism 68'. Thus, the hand 25 will move one minute clockwise from its original zero position.

It is apparent that when the relay 3 is energized the solenoid or stepper coil 26 will also be energized, provided that the contacts 3a are closed. Then the arm 27 will be attracted by the solenoid 26 and its outer end will engage the gear 29, rotating the gear clockwise. The turning of the gear 29' will shift the tape 8 in the direction from the reel 8a toward the relay 8b.

At the time the tape 8 was in its neutral position the perforation 10 was located directly below the conductive wheel 31 shown in Figure 7 so that the brushes 32 and 33 were connected with each other and thus the relay C was energized. Thus, all the open contacts of the relay C were closed and all the closed contacts were opened.

It should be noted that at the time the relay C was closed its contacts C4 were also closed, thereby illuminating the lamp LA1 shown in Figure 1, which indicates that the train is on schedule.

As soon as the relay C is energized, the contacts C1 close and the contacts C2 and C3 open. The function of the contacts C1 and C2, shown in Figure 1, is to insure a clockwise movement of the hand 25 of the indicator 1 at the beginning of the operation, irrespective of whether the impulses actuating the indicator 1 come from clock-actuated disk 2 or from the distance-actuated tape 4.

As already stated, the hands 68 and 25 point to zero at the beginning of the operation. Obviously it would be improper for the minute hand 25 to start moving counter-clockwise at this time. The closing of the relay contact C1 and the opening of the relay contact C2 assures that any impulses, whether they be omitted by the relay 7 or the relay 3 are directed by the relay C1 to the line 3' and the solenoid or stepper coil 19, which will actuate the arm 21" and the gears 22a, 23 and 24 to move the hand clockwise. The solenoid or stepper coil 37, which moves the minute hand 25, counter-clockwise, continues to remain de-energized.

As already stated, impulses from the relay 3 will also energize the solenoid or stepper coil 26, which will swing the arm 27 and turn clockwise the ratchet wheel 29'. Then the tape 8 is moved to the right (looking in the direction of Figure 6). This movement of tape 8 will cause its perforation 10 to move away from the wheel 31. Then the brushes 32 and 33 will not be connected anymore since the insulated tape 8 will now move into position between the wheel 31 on the one hand, and the brushes 32 and 33 on the other hand. Then the relay C will become de-energized and all the contacts of the relay C will assume the positions shown in the drawing, namely, the contact C1 will be open and the contacts C2 and C3 will be closed. It is apparent that when the contacts C2 are closed and the contacts C1 are open, the solenoid or stepper coil 37 is capable of being energized by impulses from the relay 7.

Figures 6 and 7 show that when the tape 8 is moved to the right the perforation 11 will move into position under the conductive wheel 36, so that the wheel 36 will be able to establish an electrical connection between the brushes 34 and 35. Then, the circuit containing the source 32' will be closed to the relay L, and then all the open contacts of the relay L will be closed and the closed contacts will open. The contacts L1 shown in Figure 1 will be closed, thereby supplying electrical current to the lamp LA3, which will light and illuminate the sign stating that the vehicle is behind schedule.

As already stated, the tape 4 is actuated during the movement of the vehicle by the distance-actuated mechanism 85a which drives the sprockets 48 engaging the sprocket tracks 48a and 48b.

The perforations 5 which are placed to indicate the pre-determined speed of the vehicle during its forward movement are adapted to move below the brushes 55 and 55', thereby establishing an electrical connection between these brushes through the conducting wheel 49.

During the reverse movement the perforations 6 perform a similar function since they provide a connection between the wheel 54 and the brushes 60 and 60'. In the course of the forward movement the contacts F10 (Fig. 5) are closed, while the contacts R10 are open. The reverse is true during the return movement of the vehicle.

As soon as the relay 7 is energized, it will close the electrical circuit to the stepper coil or solenoid 37. At the same time the contacts 7A will be closed so that a connection will be established between the electrical source 7' and the stepper coil or solenoid 61.

It is obvious from the above that the impulses from the relay 7 will counterbalance the impulses from the relay 3 through all the operation of the apparatus.

The relay A located between the brushes 55, 55', 60 and 60' on the one hand, and the relay 7, on the other hand, prevent the improper operation of the apparatus when the vehicle stops. Let it be assumed that during the forward movement of the vehicle one of the perforations 5 registers with the wheel 49 and the brushes 55 and 55', so that the relay 7 and the neutralizing coil 65 of the relay 3 becomes energized. Let it be supposed that the vehicle at that instant ceases to move, so that the tape 4 remains in the above-described position in which the relay 7 and the neutralizing coil 65 remain energized. Then the relay 3 will fail to pickup despite the fact that its coil 64 was energized by the clock-actuated disk 2. Thus, the relay 3 will remain inoperative so long as the train is at a standstill.

The relay 3 would then continue to receive pulsations indicating that the train is losing time but since the coil 7 would be continuously energized, no indications from the disk 2 would reach the indicator 1. The relay A serves to prevent this erroneous indication. For this purpose the relay A is constructed as a time-lag relay, which picks up slightly after the relay 7 and the circuits associated with it are energized. As soon as the relay A becomes energized it will open contacts A1 with the result that the relay 7 will become de-energized.

*Example: Train late*

Let it be assumed by way of illustration that the train or other moving body is 25" behind schedule. This indicates that the pulsations from the clock-actuated disk 2 have exceeded by 25 pulsations perforations 5 of tape 4.

Let it be further assumed that the train begins to make up time so that the stepper coil 37 is energized more often than the stepper coil 19. Then the minute hand 25 and the hour hand 68 connected therewith by the mechanism 68' moves gradually to their zero positions. When the minute hand 25 reaches the zero position the tape 8 would be also moved to its central position wherein the perforation 10 is moved again under the wheel 31 so as to provide connection between the brushes 32 and 33 and to energize the relay C. The operation of the relay C, when energized, has already been described.

Let it be assumed now that the train begins to move ahead of schedule. Then the tape 8 is moved to the left (looking in the direction of Figure 6) so that the perforation 9 would be moved below the wheel 69. The wheel 69 will provide electrical connection between the brushes 70 and 71, thereby energizing the relay E. As soon as the relay E is energized its contacts E1 and E3 will open while the contacts E2, E4 and E5 will close. The closing of the contacts E5, shown in Figure 1, will provide a supply of electrical current from the terminals 100a to the lamps LA2 with the result that the signal "ahead of schedule" will be illuminated.

The opening of the contacts E1 and E3 and the closing of the contacts E2 and E4 will interchange the electrical connections to the stepper coils 37 and 19 so that at this time the stepper coil 37 will respond to impulses from the relay 3 while the stepper coil 19 will respond to impulses from the relay 7. These connections are the reverse of those existing at the time the vehicle was late. It is apparent that this arrangement will result in correct indications upon the indicator 1.

*Example: Train stops while ahead of schedule*

Let it be asumed by way of example that the train is 25 minutes ahead of its schedule and makes an unscheduled stop. It is apparent that the train is losing time now so that the hands 25' and 68 must move counter-clockwise while the train is at a standstill. Then, pulsations from the clock-actuated disk 2 will be transmitted to the stepper coil 37 in order to move the hands 25' and 68 counter-clockwise. Since the train is at a standstill the tape 4 does not move and, therefore, no impulses will reach the indicator from the relay 7. On the other hand, the relay 3 will transmit the impulses from the disk 2 to the stepper coil 37 with the result that the hands 25' and 68 will gradually move counter-clockwise. It should be noted that the pulsations to the stepper coils 26 and 61 remain the same since no connections are interchanged.

When the hands 68 and 25' reach the zero the relay C will be again energized by the perforation 10 and will operate in the previously described manner.

Let it be assumed that the train continues to lose time either by continuing to stand still or by moving more slowly than its timetable calls for. Then the tape 8 will move so that the perforation 11 would be brought below the wheel 36 with the result that the brushes 34 and 35 will be interconnected and the relay L will be energized. The contacts L1 will then close and the lamp LA3 illuminating the sign "Behind Schedule" will be lit. The connections to the stepper coils 19 and 37 will remain in their original positions shown on Figure 1.

*Example: Vehicle stops on schedule*

As already stated, perforations 40 on tape 4 (Fig. 4) are used to designate scheduled stops during the forward movement of the train. Similarly, perforations 41 designate scheduled stops during the reverse movement of the train.

As already stated, perforations 40 provide connections between brushes 56 and 56' and the conducting wheel 50, so as to energize the relay SS.

During the return movement of the vehicle brushes 59 and 59' are connected through a perforation 41 with the wheel 53.

During the forward movement the contacts F11 are closed while during the return movement the contacts R11 are closed, so that the relay SS is also energized.

As soon as the relay SS is energized the contacts SS1, shown in Figure 10, will open so that the electrical current from the source 77a will not flow through the solenoid 77. Then the arms 79 and 80 will move into the position shown in Figure 10, wherein the clutch plate 83' is disconnected from the clutch plate 83 and the clutch plate 84 is disconnected from the clutch plate 84'. Consequently, the operative connection between the distance-actuated mechanism 85a and sprocket 48, which drives the tape 4, will be interrupted.

At the same time the contacts SS2 will be closed by the relay SS and the current from the source 101a will flow through the solenoid 101. The solenoid 101 will pull the arms 102 and 103, causing them to swing about their pivotal points 102' and 103', respectively. These arms will then release their grip upon the clutch plates 106 and 107 and the spring 108 will press these clutch plates against the clutch plates 106' and 107', respectively. Then the clock 109A will be connected through the shaft 109', the shaft plates 106', 106, 107 and 107', and the gears 98, 97 and 96 with the shaft 98a, and the sprocket 48 connected therewith.

It should be noted that the length of the perforation 40 corresponds to the duration of the scheduled stop. If, for example, the scheduled stop is for five minutes, the corresponding slit 40 is made sufficiently long so that the wheel 50 will engage the brushes 56 and 56' for five minutes. At the end of the five minutes the tape 4 which was moved by a clock 109A will shift the opening 40 away from the wheel 50 so that the connection between the brushes 56 and 56' will be interrupted and the relay SS will be de-energized. Then the contacts SS2 will be open and the contacts SS1 will be closed. The clutches will assume their previously-described positions wherein the sprocket 48 was driven by the distance-actuated mechanism 85a.

It should be noted that during the scheduled stop the clock-actuated disk 2 was disconnected since the contacts SS3 of the relay SS were open. At the end of the scheduled stop when the relay SS is de-energized, the contacts SS3 will be closed again so that the disk 2 will act once more in conjunction with the indicator 1.

Figure 12:
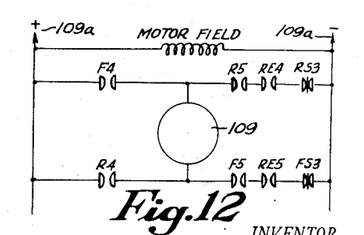
Figure 12 is a diagram illustrating the motor circuit used for resetting the tape shown in Figure 3.

When the tape 4 (Fig. 4) reaches the forward end of a scheduled trip, the perforation 42 will move below the wheel 51 and will provide an electrical connection between the brushes 57 and 57'. Then the relay FS (Fig. 5) will be supplied with electrical current from the source 57a and will become energized, thereby closing the contacts of the relay. The contact FS1 (Fig. 11) will be closed and will establish an electrical circuit containing the source 76a and the relay RE which is the master reset relay. The closing of the relay RE will close the contacts RE1 (Fig. 11) and RE4, RE5 (Fig. 12), and RE6, RE10 (Fig. 1), while the contacts RE2, RE3 (Fig. 10), RE9, RE11, RE7 (Fig. 1), and RE9 are opened.

The closing of the contacts RE1, shown in Figure 11, will provide a holding circuit for the relay RE, so that the relay RE can remain energized irrespective of the position of the button 114.

The opening of the relay RE2, shown in Figure 10, will interrupt the flow of electrical current to the solenoid 78, so that the solenoid 78 will become de-energized and the connections between the clutch plates 89 and 95 will be interrupted; similarly the clutch plate 90 will be disconnected from the clutch plate 94.

Contacts RE5 are used to complete the electrical circuit to the motor 109 (Fig. 12) in the event that the contacts FS3 are closed. In that case the current from the source 109a will flow through the motor 109 and the closed contacts RE5, F4 and F5.

The opening of the contacts RE7 and RE9 (Fig. 1) will disconnect the relays 3 and 7 from the indicator 1 during the resetting.

In the above-described example the tape 4 reached its forward end at the time when the vehicle completed its forward movement. In that case it is not necessary to use the motor 109 for the purpose of actuating the tape 4 and, therefore, the contacts FS3 of the relay FS will remain open.

The motor 109 is required to actuate the sprocket 48 only if for some reason the movement of the tape 4 has not kept pace with the travel.

As shown in Figure 11, the circuit of the relay RE includes the contacts RE1 and C7, the contacts FS4 being open.

If the vehicle arrives at its destination on time, the tape 8 will be in its neutral position in which the opening 10 is located below the wheels 31, so that the relay C is energized. In that case the contacts C7 of Figure 11 will be open so that the resetting relay RE will not pick up.

However, should the vehicle arrive either late or early at its destination, the relay C will be de-energized at that time and then the relay RE may be energized through the contacts C7, which will be closed.

Should the vehicle arrive ahead of schedule the contacts E6 (Fig. 2) will be closed so that a resetting circuit will be established through the positive terminal of the source 7' (Fig. 1), the contact 110 of the solenoid 37, the arm 111, contact 112, closed contacts RE10, contacts C3 and line 2L contact RE6 to the solenoid 26 and the source 7'. As already stated, the relays 3 and 7 are disconnected since the contacts RE11, RE9 are open during the resetting process.

It should be noted, however, that the solenoid 37 would be energized by electrical current flowing through the contacts RE10 and C3. The solenoid 37 will actuate its stepper arm 38 thereby turning the gears 22, 23 and 24, and moving the indicator 1 to its zero position. Similarly, the solenoid 26 will actuate the arm 27, which will turn the gear 29' and will move the tape 8 to its middle position.

It should be noted in this connection that at the time the arm 38 swings about its pivot 39, the circuit to the solenoid 37 is open since at that time the arm 111 is moved away from the contacts 110 and 112. Similarly, the downward movement of the arm 27 will open the circuit to the solenoid 26. The magnetic flux of the solenoids 37 and 26 does not disappear before the stepper arms 38 and 27 have completed the stepping operation. When the magnetic flux disappears the arms 38 and 27 will return to their original positions for another stepping operation which takes place as soon as the electrical circuits to the solenoids have been re-established by the engagement of the arms with the adjacent contacts.

These stepping operations continue until the tape 8 is moved into its center or neutral position, wherein the wheel 31 will engage the brushes 32 and 33, thereby actuating the relay C. When relay C is actuated the contacts C3 will open, thereby interrupting the stepping operations of the solenoids 37 and 26 upon the indicator 1 and the tape 8, respectively. At that time the indicator 1 has returned to its zero position.

In the event that the moving vehicle arrives late at its destination, the contact L2 (Fig. 2) will be closed at that time, and then the solenoid 61 will be energized instead of the solenoid 26, for the purpose of moving the tape 8 back to its middle position.

As indicated on Figure 11, the relay RE will become de-energized as soon as the movement of the tape 8 to its middle position has energized the relay C and caused the contacts C7 to open.

In the event that the tape 4 did not maintain its synchronization with the movements of the vehicle, the motor 109 will be actuated to complete the winding of the tape 4. It will be noted that the resetting coil RE can be energized either through the contacts C7 (Fig. 11) or through the contacts FS4 and RS4, which are connected in series. The contacts FS4 open when the tape 4 has reached its forward end and has energized the relay FS in the manner previously described. The resetting operation is completed when the contacts FS4 and C7 are open.

It is apparent that the resetting operation can be carried out in one of three ways in the event that the vehicle has arrived at its destination and the tape 4 has not kept pace therewith, so that the relay FS has not become energized.

In the first place, it is apparent that the clock-actuated disk 2 (Fig. 1) will continue to send its impulses to the indicator 1 and the tape 8 after the train has reached its final destination. Thus, the tape 8 will continue moving until the perforation 12 or the perforation 13 moves below the wheel 73, which will engage the brushes 74 and 75 and energize the relay S. As soon as the relay S becomes energized its contacts S1, shown in Figure 11, will be closed, thereby establishing a connection between the source 76a and the relay RE. As soon as the relay RE has become energized the resetting operation will be carried out in the manner previously described.

The second method of resetting the apparatus is for the operator to press upon the button 114 shown in Figure 11. This will energize the relay RE and then the contacts RE1 will be closed. Then the relay RE will continue to be supplied with electrical current through the contacts RE1, even after the operator moves his finger from the button 114.

The third way of carrying out the automatic resetting operation is for the operator to press upon the reverse button 113, if the reverse operation is commenced before the perforation 12 or the perforation 13 is moved below the wheel 73 for the purpose of energizing the relay S.

It should be noted in this connection that the buttons 76 and 113 are connected with each other by any suitable connecting means in such manner that when one of these buttons is open the other one will be closed. Therefore, when the operator presses down on the button 113, the button 76 will be moved out and away from its contacts. It should be noted, however, that the contacts F1 will remain closed and create a holding circuit so that the relay F will remain energized until the resetting is completed. This arrangement is important since the motor 109 (Fig. 12) can be operated in two opposite directions during the resetting action. The contacts F4 and F5 are used to actuate the motor 109 in its forward direction for the purpose of moving the tape 4 forward to its forward end. On the other hand, the contacts R4 and R5 are used to operate the motor in its reverse direction so that the motor will move the tape 4 to its opposite end, which coincides with the end of the return trip. At that time the perforation 43 of the tape 4 (Fig. 4) is moved below the wheel 52 so that a connection is established between the brushes 58 and 58' and the relay RS is energized.

As already stated, the motor 109 is used only when the movements of the tape 4 have not kept pace with the movements of the vehicle, as, for example, in the case of mechanical failure. As shown in Figure 10 the motor 109 is connected with the sprocket 48 by means of the shaft 115.

As already stated as soon as the button 113 is pressed a circuit is established to the relay RE through the contacts F2. After the completion of the resetting operation the contacts C5 of the relay C and the contacts FS2 of the relay FS are opened and the relay F is de-energized so that all the closed contacts of the relay F are opened, and all the opened contacts closed. The contacts F3 are now closed so that a circuit is established to the reverse relay R which will be energized. The closing of the relay R closes its open contacts and opens its closed contacts. The contacts R1 close, thereby keeping a holding circuit to the relay R which maintains the flow of electrical current therethrough despite the subsequent opening of the button 113. The contacts R8 also close. These contacts provide a connection between the source 77a and the solenoid 77 in the same manner as was previously described in connection with the contacts F8.

As soon as the relay R is energized, the contacts R6 close and thereby provide a connection between the source 116a and the solenoid 116. The solenoid 116 swings the arms 117 and 118 about their pivot points 117' and 118', respectively, moving them out of contact with the clutch plates 121 and 122. Then the spring 123 will press the clutch plate 121 into engagement with the clutch plate 121', while the clutch plate 122 will be pressed into engagement with the clutch plate 122'. It is apparent that this will reverse the direction of the sprocket 48, even though the directions of rotation of the driven shafts remain the same.

The contacts R7 will open, thereby insuring that the solenoid 78 will not be energized by current flowing in the reverse direction (Fig. 10).

The contacts R3 (Fig. 11) operate in the same manner as the previously described contacts F2, and accomplish the resetting after the completion of the reverse run.

As already stated, the perforation 6 of the tape 4 (Fig. 4) will move below the wheel 54 during the reverse run and will establish a connection between the brushes 60 and 60' for the purpose of actuating the relay 7 (Fig. 5).

When the tape 4 is moved to its end, after the return trip, the perforation 43 will move below the wheel 52, thereby establishing a connection between the brushes 58 and 58'. Then the relay RS will be energized with the result that the contacts RS1 will be closed. The closing of the contacts RS1 will energize the resetting relay RE (Fig. 11). The contacts RS2 will be open while the contacts RS3, shown in Figure 12, will be open to prevent the motor from turning, since it is only used when the movements of tape 4 have not kept pace with the movement of the vehicle, such as caused by mechanical failure. Contacts FS3 perform the same function as contacts RS3 at the end of the forward run.

Contact RS4 (Fig. 11) will open when relay RS is energized, so that the electrical circuit to the resetting relay RE is through contact C7. As soon as indicator 1 and tape 8 are reset, as previously described, relay C is energized and the contacts C7 (Fig. 11) will open, thus de-energizing relay RE.

When the contacts RS2 and C6 are opened (thereby indicating that the apparatus is reset) the relay R will be deenergized and all the closed contacts of the relay R will open while all the open contacts will close. The apparatus is now ready for a forward operation.

The resetting operation, at the end of the return trip, can be carried out in the same manner as the previously described resetting operation at the end of the forward trip. This can be done by pressing the reset button 114, by pressing the forward button 76 (provided that a forward operation is desired at that time) or by permitting the clock-actuated disk 2 to operate the tape 8 until the relay C is energized in the manner previously described.

Push buttons 76 and 113 are of the mechanical latch type which remain closed when pressed and, as already stated, the button 76 is mechanically connected with the button 113 so that the closing of button 76 will open button 113, whereupon the relay RE will be energized through the contacts R3. The contacts R3 remain closed until resetting operations are completed, at which time the relay R is de-energized. This closes the contacts R2 so that the relay F will become energized to stop the forward operation.

*Transmission to remote points*

An indicator used to receive indications transmitted to remote points is shown in Figure 8. This indicator is similar to one shown in Figure 1, and includes a stepper coil 37', which is connected in parallel with a stepper coil 37 (Fig. 1) between conductors 2L and LA. The stepper coil 19' (Fig. 8) is connected in parallel with the stepper coil 19 (Fig. 1) by the lines LA and 4L. Due to these connections the coils 37' and 19' will become energized as soon as the coils 37 and 19 are energized. The stepper coil 37' cooperates with an arm 38' which is pivoted about the point 29' and is adapted to actuate a gear 22b. The gear 22b is connected with the gear 23', which meshes with the gear 24'. The stepper coil 19' actuates an arm 20', which swings about the pivot 21a. The arm 20' actuates the gear 22a' which is also connected with the gear 24' through the gear 23'. It is apparent that the stepper coils 37' and 19' will actuate the hands 25' and 68'. Thus, the indications upon the indicator 1' of Figure 8 will correspond to those shown on the indicator 1, shown in Figure 1.

It is apparent that any suitable number of indicators shown in Figure 8 may be connected in parallel with the indicator 1 shown in Figure 1. The indicator 8 may be provided with any suitable indicia or signs indicating that a train is behind schedule, ahead of schedule or on time. These indicia may be illuminated by any suitable lamps (not shown) which may be grounded at 100b, and which may be connected by conduits 1L, EL and CL with the lamps LA1, LA2 and LA3, shown in Figure 1.

The impulses of the relays 3 and 7 of Figure 1 can be utilized to show all remote locations when a train or vehicle will arrive at a desired point, and the indications may be given in minutes and hours.

Figure 13:
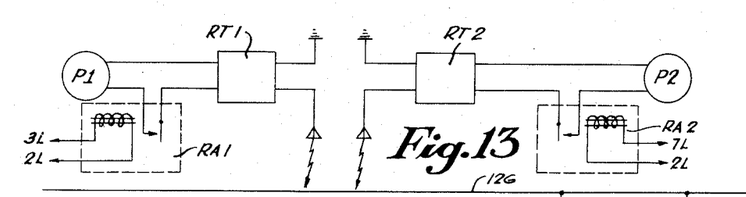
Figure 13 is a diagram illustrating a device for transmitting lag or lead indications to remote points.

Figure 13 illustrates diagrammatically the manner in which the lag or lead indications are transmitted. Conduits 2L and 3L are connected to a relay RA1, which is used to connect a power source P1 to a radio transmitter RT1.

Lines 2L and 7L are connected with a relay RA2, which connects the power supply P2 with the radio transmitter RT2.

Figures 14, 15, 16, 17:
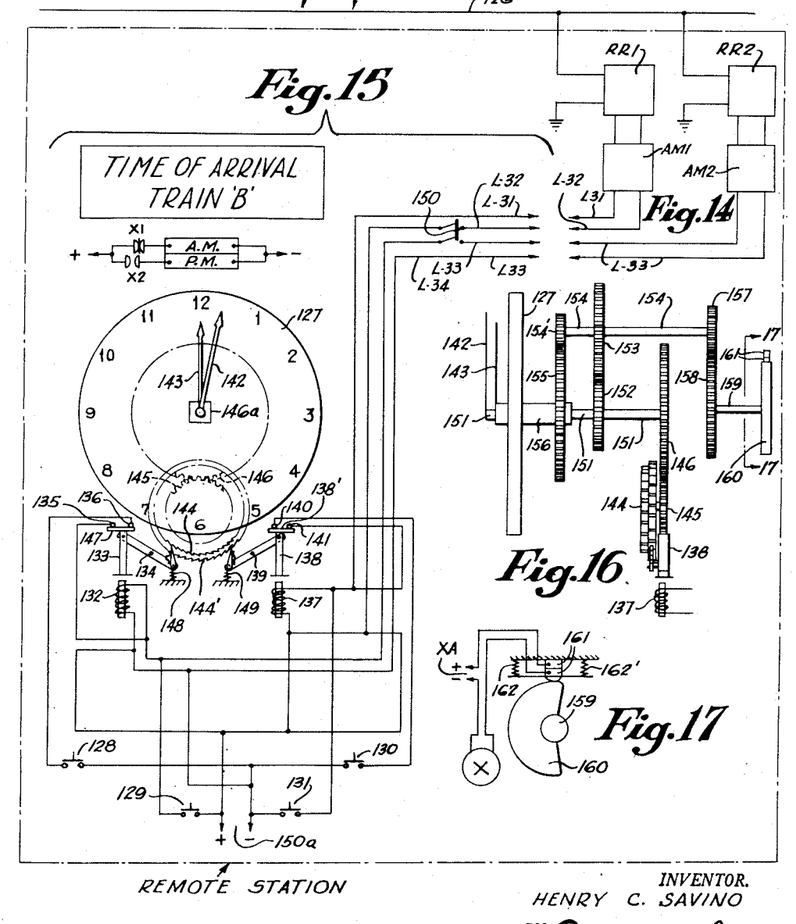

An antenna 126 is connected to radio receivers RR1 and RR2, which are connected with amplifiers AM1 and AM2. The amplifiers are connected by a switch 150 by means of lines L31, L32, L33 and L34, with solenoids 132 and 137. These solenoids or stepper coils are similar in construction and operation to the stepper coils 37 and 19 of Figure 1. Push buttons 128, 129, 130 and 131 are used for the purpose of manipulating the hands 142 and 143 of the indicator 127. The solenoid 132 attracts an arm 133 which is pivoted at 134, and which is adapted to close the contacts 135 and 136, connected to the push button 128. The outer end of the arm 133 is engaged by a spring 148, and is adapted to mesh with the teeth of a gear 144.

Similarly the solenoid 137 attracts an arm 138 which pivots around 139 and closes contacts 140 and 141 by means of a conducting strip 138'. The outer end of the member 138 is connected by a spring 149 and meshes with a gear 144'.

The gears 144 and 144' are operatively connected with a gear 145, which meshes with a gear 146. The gear 146 is connected by a clockwork mechanism 146a with the minute hand 142 and the hour hand 143.

*Transmission of lag and lead indications*

The relay RA1, shown in Figure 13, operates every time the relay 3 (Fig. 1) is energized, the impulses being transmitted from the stepper coil 26 by means of lines 2L and 3L. The relay RA2 operates every time the relay 7 (Fig. 1) is energized; the impulses being transmitted by means of lines 2L and 7L which also connect to stepper coil 61 (Fig. 2). The impulses sent out by the relays RA1 and RA2 are received at desired points by the antenna 126. The antenna 126 may be of the usual type, or it may be of the type installed alongside railroad tracks and used in radio telephone systems. The impulses received by the antenna 126 are transmitted to radio receivers RR1 and RR2, which are so constructed that the radio receiver RR1 receives only the frequencies of the transmitter RT1, while the receiver RR2 receives only the frequencies of the transmitter RT2. The received radio pulses are amplified by the amplifers AM1 and AM2 in the usual manner.

By way of example, let it be assumed that in accordance with a timetable a certain train or vehicle should arrive at the station in question at 12:02 p. m. The setting of the indicator 127 to show this time is accomplished by operating the push buttons 129 to 131. It is apparent that if the button 128 is pressed it will energize the stepper coil 132 through the source 150a, whereupon the arm 133 will turn clockwise the gears 144 and 145, so that the gear 146 and the hands 142 and 143 will be moved counter-clockwise. It is apparent that when the stepper arm 133 is moved downward by the stepper coil 132 the circuit to the coil 132 is broken since the conducting strip 147 is moved away from the contacts 135 and 136. Then, the spring 148 actuates to return the arm 133 for another stepping operation. Due to this arrangement, the stepping operation and the movement of the hands would be very rapid. When the hands are in the vicinity of their final position, it is necessary for the operator to release the push button 128 and thereupon to move the hands slowly into their final position by means of the push button 129. The hands move only one step each time that the push button 129 is pressed, and thus they can be moved slowly and accurately to their final position.

Push buttons 130 and 131 operate in a manner similar to that of the push buttons 128 and 129, respectively, moving the hands 142 and 143 in a clockwise direction.

When the hands 142 and 143 have been set to the predetermined time of arrival of a vehicle, the double-pole, single-throw switch 150 is ready to be actuated for the purpose of connecting the indicator 127 to the radio receivers RR1 and RR2. The switch 150 is closed at the time when the train or vehicle is scheduled to start its trip toward the station of destination. By way of example, if the time of arrival of the train at the station wherein the indicator 127 is located is 12:02 p. m., and if the train is scheduled to carry out its trip to that station in four hours, then the operator will close the switch at 8:02 a. m., i. e., at the time of the scheduled start.

Since the switch 150 is closed the indicator 127 will be able to receive lag or lead indications from the remote vehicle. A pulsation caused by the relay 3 (Fig. 1), which closes the contact 3A to actuate the coil 26 (Fig. 2) will also operate the relay RA1 (Fig. 13), thereby causing the source P1 to emit a signal through the radio transmitter RT1. That signal is received by the antenna 126, and the radio receiver RR1, and is amplified by the amplifier AM1 to energize the stepper coil 137. As already stated, the stepper coil 137 will actuate the arm 138 and the gears 144', 145 and 146, thereby moving the hands 142 and 143 clockwise. It is, therefore, apparent that pulsations from the relay 3 (Fig. 1) will move the hands 142 and 143 clockwise, thereby indicating that the train will actually arrive later than schedule.

Pulsations from the relay 7 (Fig. 1) will close the contacts 7A and will energize the relay RA2 through the conduit 2L and 7L. The relay RA2 will cause the source P2 to emit a signal which will be sent to the radio transmitter RT2 and which will be of a pre-determined frequency different from the frequency of signals emitted by the transmitter RT1. The signal is received by the radio receiver RR2, which is constructed to respond only to signals of that frequency. The signal is amplified in the amplifier AM2 and actuates the stepper coil 132. As already stated, the stepper coil 132 will move the hands 142 and 143 counter-clockwise through the arm 133 and the gears 144, 145 and 146. Therefore, it is apparent that pulsations from the distance-actuated relay 7 (Fig. 1) will move the hands 142 and 143 counter-clockwise.

It is apparent that if pulsations from the relay 7 are equal to the pulsations from the relay 3 the hands 142 and 143 will not move. On the other hand, if the train is ahead of schedule, for example, the apparatus will receive more pulsations from the relay 7 than from the relay 3, and then the hands 142 and 143 will be moved counter-clockwise to indicate that the actual time of arrival will be ahead of schedule. It is obvious that the difference between the scheduled time of arrival and the actual time of arrival will depend on the extent by which a train is late or early. If the pulsations from the clock-actuated relay 3 exceed the pulsations from the relay 7, the indicator 127 will show that the train will arrive later than scheduled. It is apparent that the indicator 127 will indicate directly in minutes and hours the actual time of arrival.

Figure 16 illustrates the mechanism 146a used to enable the hour hand 143 to move in the same direction as, and at a ratio of 1 to 12 to, the minute hand 142. The gears 144 and 145 are mounted upon the same shaft and the gear 145 meshes with a gear 146 which is keyed upon the shaft 151. The minute hand 142 is firmly connected to the shaft 151. Another gear 152 is also keyed upon the shaft 151, and meshes with a gear 153 which is keyed upon the shaft 154. A gear 154' is also keyed upon the shaft 154 and meshes with a gear 155, which is keyed upon a sleeve 156. The hour hand 143 is firmly connected with the sleeve 156 and is rotatable therewith. The ratio of the various gears is such that the hour hand 143 moves at the rate of 1 to 12 in comparison with the movement of the minute hand 142. Furthermore, the various gears are so arranged that the hour and minute hands move in the same direction. The described mechanism may obviously be replaced by any other suitable device known in the art.

The indicator, shown in Figure 15, may also be used to show whether the time of day in question is a. m. or p. m. As shown in Figure 16, the shaft 154 rotates along with a gear 157, which meshes with a gear 158. The gear 158 is keyed upon a shaft 159, which carries a cam 160, shown in Figure 17. The cam 160 is adapted to close contacts 161, against the action of springs 162 and 162'. The gears are so constructed that the contacts 161 will remain closed for twelve hours and will stay open for the following twelve hours. When the contacts 161 are closed the relay X is energized by means of its source Xa. The closing of the relay X opens the contacts X1 and closes the contacts X2, shown in Figure 15. Then the sign p. m. will become illuminated. When the cam 160 is moved out of engagement with the contacts 161, the contacts 161 are opened by the springs 162 and 162'. Then the relay X will be de-energized with the result that the contacts X1 will be closed and the contacts X2 will be opened so that the a. m. sign will be illuminated.

*Position indicator*

Figure 18:
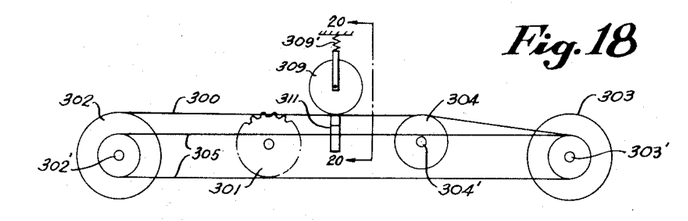
Fig. 18 is a diagrammatic side view showing a tape which is wound and unwound on reels, and which is moved by a distance-actuated sprocket.

Figure 18 shows a tape 300 which is wound upon a reel 302, and which is adapted to be unwound from that reel and to be wound upon a reel 303, during the forward movement of a vehicle. The procedure is reversed, namely, the tape 300 is wound upon the reel 302 during the reverse trip of the vehicle. A distance-actuated sprocket 301 is used to move the tape 300. As shown in Figure 10, the sprocket 301 is connected to the distance-actuated mechanism by a clutch 342. A suitable belt 305 joins the reels 302 and 303 so that their movements synchronize. The reel 302 is carried upon the shaft 302', while a shaft 303' carries the reel 303. A free wheel 304 engages the tape 300 and is mounted upon a shaft 304'.

Figure 19:
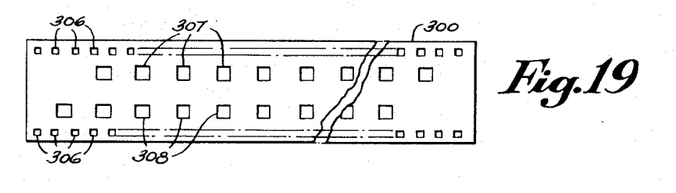
Figure 19 is a plan view of the tape shown in Figure 18.
Figures 20, 21:
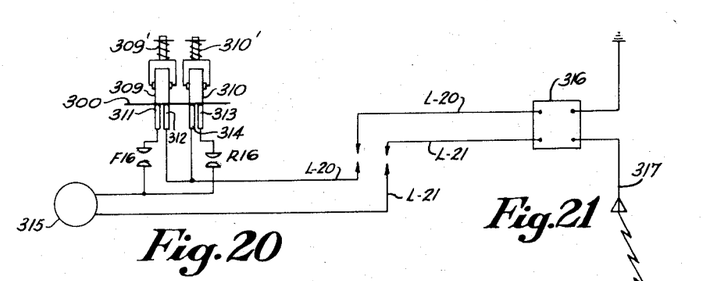
Figure 20 is a section along the line 20—20 of Figure 18.
Figure 21 is a diagram showing a radio transmitter.

As shown in Figure 19 the tape 300 has two sets of perforations, 307 and 307, the perforations 308 being used for the forward trip while the perforations 307 are used for the return trip. As shown in Figure 20, the perforations 307 are adapted to be moved below a conducting wheel 310 and to bring this wheel into engagement with brushes 313 and 314. Perforations 308 are adapted to be moved under the conducting wheel 309, thereby connecting it with the brushes 311 and 312. Perforations 306 are engaged by the sprocket 301 and are used to actuate the tape 300.

As shown in Figure 21, a suitable radio transmitter 316 is provided with an antenna 317, and is connected with lines L20 and L21.

Figures 22, 24:
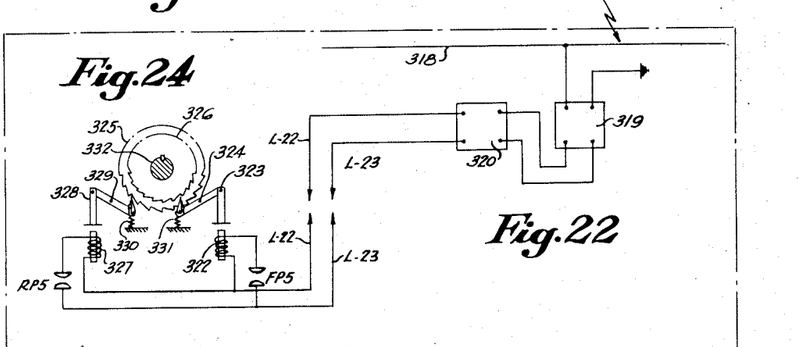
Figure 22 is a diagram showing a radio receiver and amplifier.
Figure 24 is a section along the line 24—24 of Figure 23.

Impulses transmitted by the transmitter 316 are received by the antenna 318 and the receiver set 319. The receiver set 319 is connected with an amplifier 320 which is connected by lines L22 and L23 with stepper coils 321 and 322, respectively.

Figure 23:
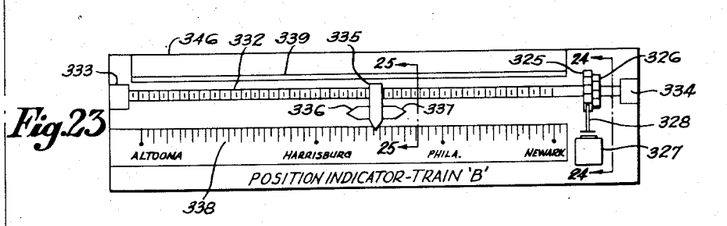
Figure 23 is a diagrammatic illustration of a position indicator.

Figure 23 illustrates a position indicator 346, which includes a pointer 335 movable along a graduated scale 338, which may be provided with inscriptions indicating the various stops of a train. The pointer 335 carries directional arrows 336 and 337, which point in opposite directions. A screw 332 is used to move the pointer in opposite directions.

The screw 332 is carried by bearings 333 and 334, and is rotated in one direction by the stepper arm 328 which is actuated by the stepper coil 327. The screw 332 is rotated in the opposite direction by the stepper arm 323, which is actuated by the stepper coil 322.

Figure 25:
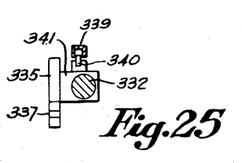
Figure 25 is a section along line 25—25 of Figure 23.

The pointer 335, along with the directional arrows 336 and 337 is carried by an adapter 341, which is shown in Figure 25, and which is movable along the screw 332 when the screw is rotated. A wheel 340 is firmly connected with the adapter 341, and guides it along track 339.

Figure 26:
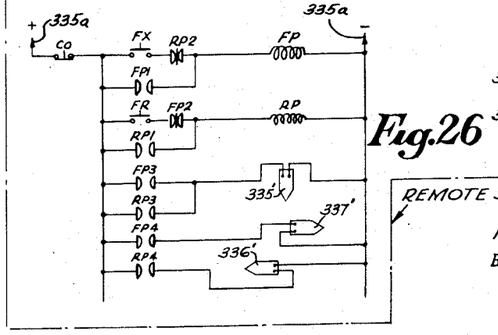
Figure 26 is a diagram illustrating the electrical circuit for connecting and disconnecting the position indicator.

As shown in Figure 26, the pointer 335 and the arrows 336 and 337 are illuminated by means of lamps 335', 336' and 337' which are connected with a source 335A by parallel circuits containing contacts FP1, FP2, FP3, FP4, RP1, RP2, RP3 and RP4, push buttons CO, FR and FX and relays FP and RP.

*Operation of position indicator*

As shown in Figure 11, the relay F is energized at the beginning of the forward trip, while the relay R is energized at the beginning of the return trip. When the relay F is energized the contacts F15 (Fig. 10) will close, while the contacts R15 are closed when the relay R is energized. The closing of the contacts F15 or R15 will energize the solenoid P. The sprocket 301 is not connected to the distance-actuated mechanism prior to the energization of the solenoid P, since the clutch 342 is kept disengaged by a spring 345 which asserts its force on the clutch 342 by means of a lever arm 343 which is pivoted at 344. The spring 345 is so constructed that it is stronger than the spring 347. When the solenoid P is energized its plunger 348 acts against the spring 345 so as to neutralize its effect on the clutch 342. Therefore, the spring 347 is now free to engage the clutch 342. Once engagd, the sprocket 301 is moved by the distance-actuated mechanism so that the tape 300 is also moved (Fig. 18).

It should be noted that the positions of the perforations 307 and 308 depend on the rate which is desired to be maintained for the purpose of sending out position-indication signals to the position indicator shown in Figure 23, and located at a remote point. By way of example, if the tape 300 is made to move at the rate of 1" for one mile of travel, and if it is desired to send an indication after every one-half mile covered by the vehicle, then it is necessary to provide the tape 300 with two perforations per inch. Obviously four perforations per inch will be necessary if one impulse for every quarter of a mile is desired.

By way of illustration, let it be assumed that one indication per mile is desired so that the tape will have one perforation per inch. Let it be further assumed that the train is moving in the forward direction so that the contacts F15 (Fig. 10) and F16 (Fig. 20) are closed. The tape 300 is then being unwound from the reel 302 and is wound on the reel 303. As soon as the perforation 308 is moved under the conducting wheel 309, this wheel will establish an electrical connection between the brushes 311 and 312.

It should be noted in this connection that the wheel 309 is forced against the tape 300 and the brushes 311 and 312 by the spring 309', while the spring 310' forces the wheel 310 against the taps 300 and the brushes 313 and 314.

Since the contacts F16 are closed the radio transmitter 316 is supplied with current from the power source 315 by the lines L20 and L21. The transmitter 316 sends out its wave energy by means of the antenna 317.

The indicator 346, shown in Figure 23, is operatively connected by pressing the push button FX. The user depresses the push button FX before the train starts. As soon as the push button FX is depressed the relay FP will become energized by the source 335A with the result that the contacts FP1, FP3, FP4 and FP5 will be closed while the contacts FP2 will be open. The closing of the contacts FP1 will establish a holding circuit for the relay FP so that it will remain energized even when the button FX is released. The closing of the contacts FP3 will illuminate the lamps 335' which provide illumination for the pointer 335. Similarly the closing of the contacts FP4 will light the lamp 337' which provides illumination for the forward directional arrow 337. The closing of the contacts FP5 connects the stepper coil 322 to the amplifier 320 by means of the lines L22 and L23. On the other hand, the contacts FP2 will open and thereby will make certain that the relay RP cannot be energized while the relay FP is energized.

As already stated, the amplifier 320 is connected to the receiver 319 which is tuned to receive only the frequency waves of the transmitter 316 by means of the antenna 318. It should be noted that the antenna 318 may be a regular radio antenna or may consist of the radio telephone wire used in train telephone communication.

When the transmitter 316 is energized its radio waves are picked up by the receiver 319 and amplified by the amplifier 320. This current is transmitted by the lines L22 and L23 to the stepper coil 322, which will swing the stepper arm 323 about its pivot point 324 and will cause it to engage the gear 326 against the tension of the spring 331. The gear 326 will move a step counter-clockwise and will turn the screw 332 which will cause a forward movement of the adapter 341 carrying the pointer 335 and the arrow 337. The extent of movement of the adapter 341 can be conveniently varied depending on the desired indications. If the scale 338 is graduated in such a manner that one graduation per mile of travel is desired, then the adapter 341 will be shifted along the scale 338 to the extent of one graduation every time that the arm 323 has moved the wheel 326 to the extent of one notch.

As already stated, the tape 300 will be wound upon the reel 303 so that a perforation 308 will move away from the wheel 309, thereby interrupting the electrical connection between the brushes 311 and 312 and de-energizing the transmitter 316. Then the stepper coil 322 will also be de-energized and the stepper arm 323 will be returned to its original position by the spring 331. As soon as another perforation 308 has established electrical connection between the brushes 311 and 312 at the end of another mile of travel, the transmitter 316 will be energized once again and will cause the stepper coil 322 to be energized and to move the screw 232 and the member 341. This operation continues so long as the tape 300 is being moved. The illumination of the direction pointer 337 demonstrates to an observer the direction of travel of the member 341. On the other hand, the pointer 335 may be used to indicate the mileage covered by the vehicle and the amount of miles necessary to be covered before the vehicle reaches a pre-determined destination.

Since the sprocket 301 is connected with the clutch mechanism which drives the sprocket 48 of the lag and lead indicator, it is necessary that the sprocket 301 be disconnected from the clutch mechanism during a scheduled stop, since the clutch mechanism will be driven by a clock mechanism and not by the distance-actuator during a scheduled stop. This is attained by a relay SS, shown in Figure 10, which is actuated only for the duration of the scheduled stop. When the relay SS is actuated its contacts SS5 are open. As shown in Figure 10, the opening of the contacts SS5 interrupts the circuit to the solenoid P with the result that the solenoid P will become de-energized causing the clutch 342 to become disengaged.

The tape 300 can be reset at the end of a scheduled trip in the manner similar to the one previously described, should the distance-actuated mechanism be, for some reason, out of synchronism with the movements of the vehicle. Once reset, the contacts F15 are open and the sprocket 301 is disconnected from the distance-actuated mechanism.

At the start of the return trip the contacts R15 close and thus connect the sprocket 301 to the distance-actuated mechanism. As already described, the clutch mechanism shown in Figure 10 is then set to rotate the sprockets 301 and 48 in opposite directions. Thus the tape 300 is then wound upon the reel 302 and is unwound from the reel 303. Since the contacts R16 are now closed the perforations 307 will provide electrical connection between the brushes 313 and 314 by means of the conducting wheel 310, so that the transmitter 316 will be actuated.

The setting of the position indicator 346 for the reverse operation takes place as follows:

The operator presses the button CO thereby de-energizing the relay FP and returning its contacts to the de-energized position. Then the operator presses the push button FR, thereby energizing the relay RP. Then the relay RP closes the contacts RP1, thus providing a holding circuit for the relay RP so that the latter remains energized even when the button FR is released. Then the contacts RP2 will open so that the relay FP cannot become energized while the relay RP is energized. The pointer 335 is illuminated by the closing of the contacts RP3. The closing of the contacts RP4 illuminates the direction arrow 336. The closing of the contacts RP5 connects the stepper coil 327 with the receiver 319. The perforations 307 of the tape 300 will bring the brushes 313 and 314 in contact with the conducting wheel 310, thereby providing impulses which will actuate the stepper coil 327. Then the screw 332 of the position indicator 346 will rotate clockwise since it will be actuated by the stepper arm 328 of the stepper coil 327. When the coil 327 is de-energized the spring 330 will move the stepper arm 328 to its original position.

In other respects the operation during the return movement is the same as during the forward movement.

Figure 27:
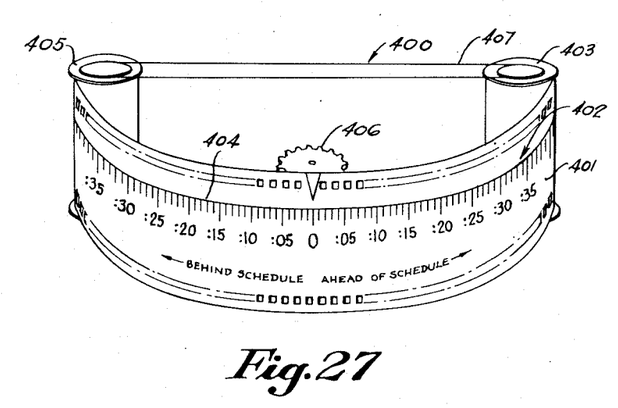
Figure 27 shows a ribbon-type indicator.

Figure 27 illustrates as an alternate construction a ribbon-type time-space lag and lead indicator. The indicator 400 includes a ribbon 401, which carries two scales, namely, a scale 402 cooperating with the spool 403 and a scale 404 cooperating with the spool 405. The scale 402 is designated as being "Ahead of Schedule," while the scale 404 is the scale "Behind Schedule," the zero position being located between the two schedules. Different colors may be used to distinguish one scale from the other. For example, the "Behind Schedule" 404 may be in red, while the scale 402, "Ahead of Schedule" may be in green. A sprocket 406 is used to drive the ribbon 401, which may be conveniently connected to the stepper switch shown in Figure 2, so that the ribbon 401 can be moved at the same rate and in the same direction as the ribbon 8, shown in Figures 2 and 6. A belt 407 is used to actuate the spools 403 and 405 simultaneously when the sprocket 406 is actuated to wind the ribbon 401 on one of the spools and to unwind it from the other spool. In other respects the operation is the same as the one previously described.

It is apparent that the invention shown above has been given by way of illustration, and not by way of limitation, and that the above-described examples are subject to variations and modifications within the limits of the present invention. All of such variations and modifications are thereby included within the scope of the present invention.

What is claimed is:

1. In a system for indicating time-space lag and lead, in combination, with a device emitting a series of uniform electrical impulses, an elongated tape having perforations formed therein and disposed along the length of the tape in accordance with a distance-time schedule and in conformity with the rate of said series of impulses, means moving said tape in accordance with the movement of a body, a conductor located on one side of said tape, and brushes located on the other side of said tape and adapted to be short-circuited by said conductor when one of said perforations is moved between said conductor and said brushes, whereby the brushes provide another series of electrical impulses, and means connecting said device with the brushes to provide impulses consisting of the difference between the two series of impulses.

2. A system for indicating time-space lag and lead, said system comprising, in combination, a device emitting a uniform series of electric impulses, another device emitting a series of electric impulses in accordance with an actual schedule, an indicator having a movable hand, two separate electro-magnetic devices for moving said hand clockwise and counterclockwise, respectively, a tape movable from a neutral position in opposite directions, means operatively connecting said devices with said tape for moving said tape when one of said series is greater than the other series, and means operatively connecting the last-mentioned means with said tape and said electromagnetic devices for operating one of said electromagnetic devices when said tape is moved from said neutral position in one direction, and for operating the other one of said electromagnetic devices when said tape is moved from said neutral position in the other direction.

3. A system for indicating time-space lag and lead, said system comprising, in combination, a clock-actuated device emitting a uniform series of electric impulses, a relay operatively connected with said clock-actuated device, another device emitting a series of electric impulses, distance actuated means varying the second-mentioned series in accordance with the path of a body, another relay operatively connected with said means, a single electrically operated indicator, and means operatively connecting said indicator with said relays and actuating said indicator by a difference in the two series transmitted by one of said relays, each of said relays comprising a main coil and an auxiliary coil; the auxiliary coil of each relay being connected to the main coil of the other relay to neutralize said relays when they are both equally energized at the same instant.

4. A system for indicating time-space lag and lead, said system comprising, in combination, a clock-actuated device emitting a uniform series of electric impulses, a relay operatively connected with said clock-actuated device, another device emitting a series of electric impulses, distance actuated means varying the second-mentioned series in accordance with the path of a body, another relay operatively connected with said means, an electrically operated indicator, means interconnecting said relays for neutralizing them when they are both energized at the same instant, two separate electromagnetic devices for actuating said indicator in opposite directions, and means operatively connecting the first-mentioned relay with one of said indicator-actuating electromagnetic devices, and operatively connecting the second-mentioned relay with the other one of said indicator-actuating electromagnetic devices.

5. A system in accordance with claim 4, wherein the last-mentioned means include contacts for disconnecting the first-mentioned indicator-actuating electromagnetic device; said system further comprising a relay actuating said contacts, and means connected with said relay for operating the same when said tape reverses the direction of its movement.

6. A system for indicating time-space lag and lead, said system comprising, in combination, a device emitting a uniform series of electric impulses, an elongated tape having perforations formed therein and disposed along the length of the tape in accordance with a distance-time schedule and in conformity with the rate of said series of impulses, a conductor located on one side of said tape, brushes located on the other side of said tape and adapted to be short-circuited by said conductor when one of said perforations is moved between said conductor and said brushes, whereby said brushes provide another series of electrical impulses, means connecting said device with said brushes and providing impulses consisting of the difference between the two series of impulses, a distance-actuated device, means connecting said distance-actuated device with said tape for moving said tape in accordance with the distance travelled by a body, a clock, and means connected with said tape, the last-mentioned means and said clock and operable by said tape for disconnecting said tape from said distance-actuated device and connecting said tape with said clock during a stop of said body.

7. A system in accordance with claim 6, wherein the last-mentioned means include electrical circuits having contacts; and relays operating said contacts and operable by said tape when the latter reaches positions corresponding to beginning and end of scheduled stops.

8. A system in accordance with claim 6, said system further comprising means disconnecting said device emitting a uniform series of electric impulses during a stop of said body.

9. A system for indicating time-space lag and lead, said system comprising, in combination, a device emitting a uniform series of electric impulses, an elongated tape having perforations formed therein and disposed along the length of the tape in accordance with a distance-time schedule and in conformity with the rate of said series of impulses, a conductor located on one side of said tape, brushes located on the other side of said tape and adapted to be short-circuited by said conductor when one of said perforations is moved between said conductor and said brushes, whereby said brushes provide another series of electrical impulses, means connecting said device with said brushes and providing impulses consisting of the difference between the two series of impulses, a distance-actuated device, means connecting said distance-actuated device with said tape for moving said tape in accordance with the distance travelled by a body, a motor, and means connected with said tape, the last-mentioned means and said motor and operable by said tape for disconnecting said tape from said distance-actuated device and connecting said tape with said motor to complete the winding of said tape when said body reached its predetermined destination prior to the completion of the winding of said tape.

10. In a supervising system, in combination with a device emitting a uniform series of electrical impulses, and another device emitting a series of electrical impulses variable in accordance with an actual schedule, a single indicator having a movable hand, an electro-magnetic device for moving said hand forward, another electro-magnetic device for moving said hand backward, electrical means operatively interconnecting said devices for producing electrical impulses proportional to the difference between said impulses, a tape movable from a neutral position in opposite directions, means operatively connecting said electrical means with said tape for moving said tape when one of said series of impulses is greater than the other series, means actuating said indicators and comprising relays operatively connected with said indicators and said electric means for operating the first-mentioned magnetic device when one of said series of impulses is greater than the other series and operating the second-mentioned magnetic device when said other series of impulses is greater than the first series of impulses, and means operatively connecting said relays with said tape for opening the relay connected with second-mentioned magnetic device when said tape is moved initially from said neutral position, whereby said initial movement of said tape from its neutral position causes said hand to move forward.

11. A system for indicating time-space lag and lead, said system comprising, in combination, two separate devices emitting series of electric impulses, means causing the impulses of one of said devices to be emitted in accordance with a theoretic schedule, means causing the impulses of the other one of said devices to be emitted in accordance with an actual schedule, an electrically operated indicator showing the difference in the two schedules, two means connected with said devices and actuating said indicator in opposite directions, said indicator including a tape having two scales thereon extending in opposite directions from a common zero point, and a pointer over said tape, the two indicator actuating means including separate spools moving said tape in opposite directions, the means connected with the two indicator actuating means comprising another tape movable when one of said series is greater than the other series, and means selectively actuating one of said spools when said other tape is moved.

12. In a supervisory system for indicating deviations from a theoretical schedule in combination with a device emitting a uniform series of electric impulses representing a theoretical schedule, and another device emitting a series of electric impulses representing an actual occurrence; an electromagnetic device connected with each of said devices, an impulse-actuated indicator for showing the difference between the theoretical and actual schedules, means operatively connecting said electromagnetic devices with said indicator for actuating said indicator by a difference in the two series of impulses transmitted by one of said electromagnetic devices, and means interconnecting said electromagnetic devices and preventing their simultaneous actuation when the impulses of the two series occur at the same instant.

13. In a supervisory system for indicating deviations from a theoretical schedule, in combination with a time device emitting a uniform series of electric impulses representing a theoretical schedule, and a distance-actuated device emitting a series of electric impulses representing an actual schedule, an electromagnetic device connecting with each of said devices, an electric impulse-actuated indicator showing the difference between the theoretical and actual schedules, means operatively connecting said electromagnetic devices with said indicator and actuating said indicator by a difference in the two series of impulses transmitted by one of said electromagnetic devices, and means interconnecting said electromagnetic devices and preventing their simultaneous actuation when the impulses of the two series occur at the same instant.

HENRY C. SAVINO.

References Cited in the file of this patent

UNITED STATES PATENTS

| Number | Name | Date |
|---|---|---|
| 756,937 | Church | Apr. 12, 1904 |
| 923,511 | Greenbaum | June 1, 1909 |
| 1,573,174 | Lasker, Jr. | Feb. 16, 1926 |
| 1,690,244 | Periale | Nov. 6, 1928 |
| 1,888,486 | Boedtcher | Nov. 22, 1932 |
| 2,205,330 | Allen | June 18, 1940 |
| 2,372,882 | Daly et al. | Apr. 3, 1945 |
| 2,413,300 | Dunn et al. | Dec. 31, 1946 |
| 2,480,160 | Poylo | Aug. 30, 1949 |
| 2,501,048 | Haller | Mar. 21, 1950 |
| 2,509,850 | Von Mulinen | May 30, 1950 |
| 2,528,790 | Scherer | Nov. 7, 1950 |
| 2,535,162 | Rodgers | Dec. 26, 1950 |
| 2,575,052 | Foltzer | Nov. 13, 1951 |